United States Patent [19]

Hsia

[11] Patent Number: 5,097,370
[45] Date of Patent: Mar. 17, 1992

[54] SUBAMBIENT PRESSURE AIR BEARING SLIDER FOR DISK DRIVE

[75] Inventor: Yiao-Tee Hsia, Shrewsbury, Mass.

[73] Assignee: Digital Equipment Corporation, Maynard, Mass.

[21] Appl. No.: 663,192

[22] Filed: Feb. 28, 1991

Related U.S. Application Data

[63] Continuation of Ser. No. 325,222, Mar. 17, 1989, abandoned.

[51] Int. Cl.⁵ .......................... G11B 5/60; G11B 17/32
[52] U.S. Cl. .................................................... 360/103
[58] Field of Search ........................................ 360/103

[56] References Cited

U.S. PATENT DOCUMENTS

| | | |
|---|---|---|
| 3,855,625 | 12/1974 | Garnier et al. |
| 4,218,715 | 8/1980 | Garnier |
| 4,420,780 | 12/1983 | Deckert |
| 4,553,184 | 11/1985 | Ogishima |
| 4,555,739 | 11/1985 | Le Van et al. |
| 4,751,135 | 10/1984 | Warner et al. |
| 4,802,042 | 1/1989 | Strom ................................. 360/103 |

OTHER PUBLICATIONS

IBM T.D.B., vol. 27, No. 10A, 3/85; 'Magnetic Disk Storage Sys. with Structured Magnetic Head Slider', pp. 5820-5821.

Tagama, "Optimum Design Consideration for Air-Lubricated Slider Bearings of Film Head", N.E.C. Research and Development, 68:90-100 (1983).

Primary Examiner—A. J. Heinz
Attorney, Agent, or Firm—Fish & Richardson

[57] ABSTRACT

A slider having a pair of rails with elongated surfaces which face the disk and are oriented generally along the direction of motion of the disk; a cavity, inset relative to the rail surfaces, is configured to produce subambient pressure tending to draw the slider toward the disk; at least one of the rail surfaces is interrupted by at least one detail configured to reduce the variation in roll for different yaw angles. In another aspect, a slider has at least one groove cut in at least one rail; the groove is oriented at an angle such that its leading end is nearer the inner end of the rail and its trailing end is nearer the outer end of the rail. Other aspects and features are disclosed.

13 Claims, 6 Drawing Sheets

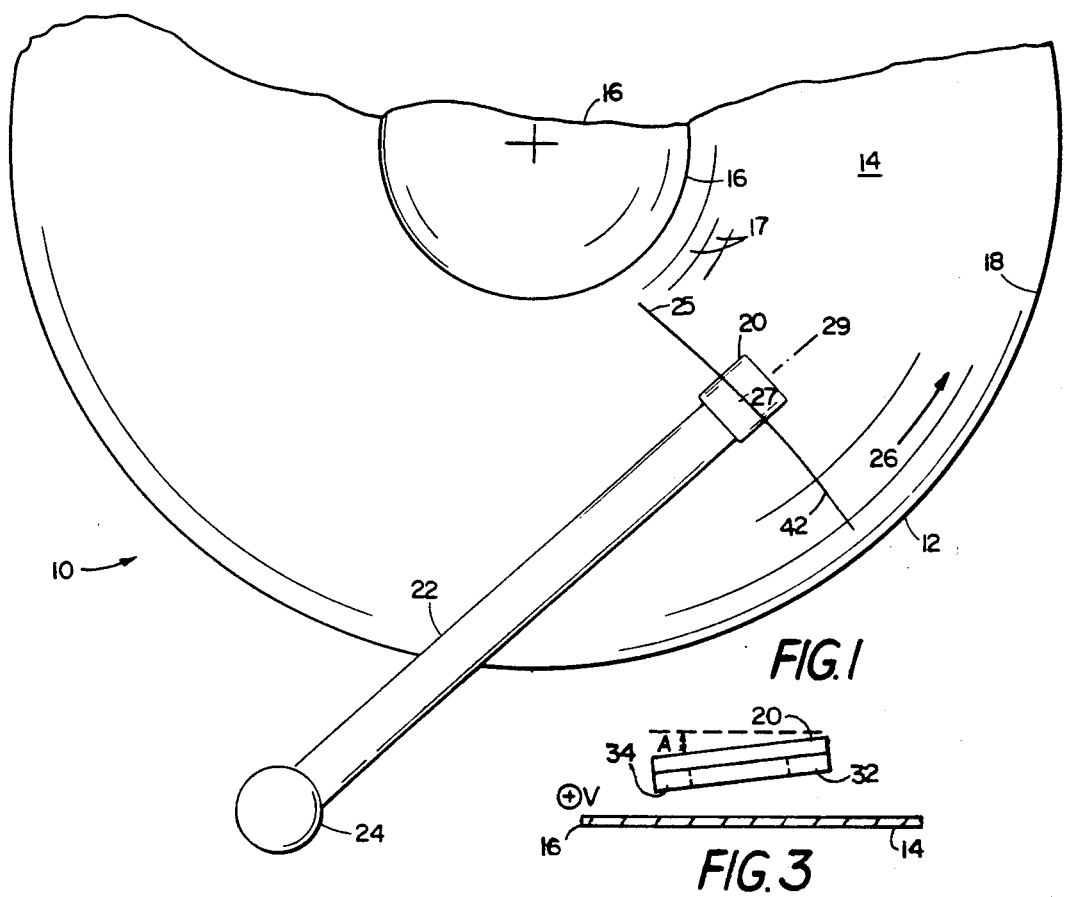
FIG.1
FIG.3
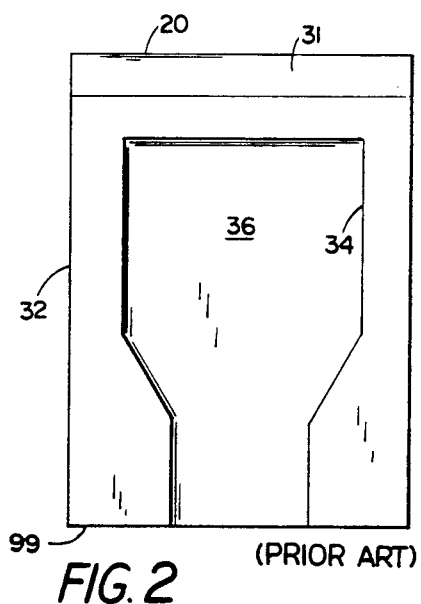
FIG.2 (PRIOR ART)
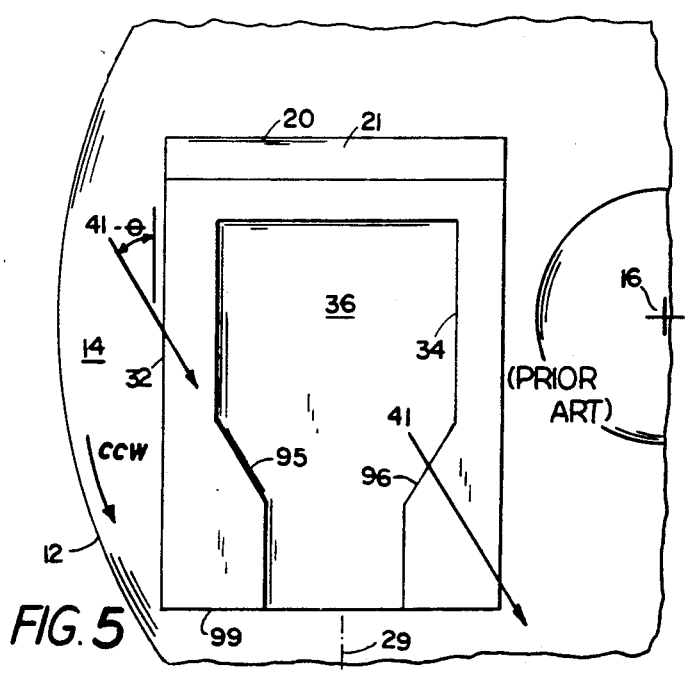
FIG.5

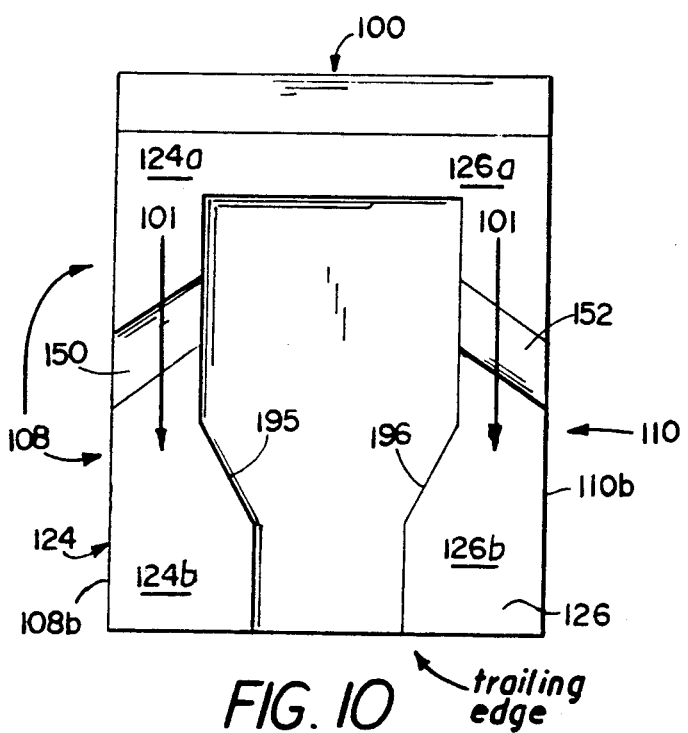
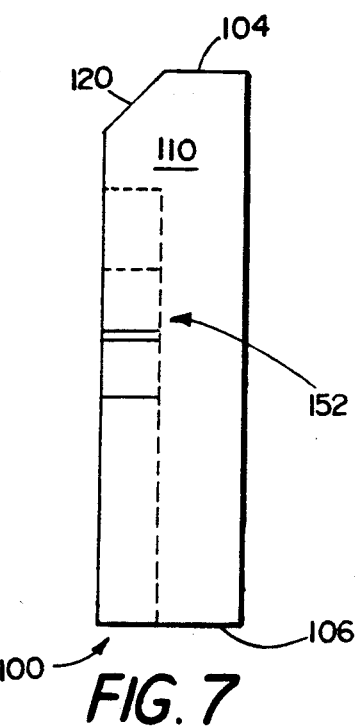
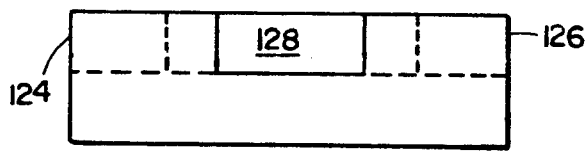

SUBAMBIENT PRESSURE AIR BEARING SLIDER FOR DISK DRIVE

This is a continuation of copending application Ser. No. 07/325,222 filed on Mar. 17, 1989 now abandoned.

BACKGROUND OF THE INVENTION

This invention relates to sliders for recording heads used with storage disks.

In a typical magnetic or optical disk storage system, a read/write head is mounted on the rear end of a slider. The slider is supported by a positioning arm/suspension assembly and configured so that when the disk is rotated rapidly, the slider flies at a height above the disk. To achieve high storage densities, the slider must be flown close to the disk surface. One technique is to mechanically bias the positioning assembly to force the slider toward the disk. Another proposed approach is to contour the slider bottom so that it generates subambient (or negative) pressure to draw the bottom of the slider down near the disk.

In flight, sliders are subject to roll, which is the banking of the slider relative to a horizontal axis of the positioning arm. Sliders are also subject to yaw, where the trailing edge of a slider is either closer to (positive yaw) or farther from (negative yaw) the disk center than is the slider leading edge. The yaw angle is measured as the angle between the longitudinal axis of the slider and the tangent to the disk track.

SUMMARY OF THE INVENTION

In one aspect of the invention, a slider for carrying a transducer near to the surface of a storage disk at varying yaw angles, the slider being subject to roll according to yaw angle, includes at least two rails, the rails having elongated surfaces for facing the disk and oriented generally along the intended direction of motion of the disk, the rails coupled to each other so as to define a cavity, the cavity configured to produce subambient pressure tending to draw the slider toward the disk, and at least one of the rail surfaces having at least one detail configured to counteract the roll associated with yaw angle.

An embodiment of this aspect may include one or any combination of the following features:

The rails are coupled by a ramp section.

The detail extends across the width of a rail surface.

Both of the rails have a respective detail.

The details respectively each include a uniform groove.

A respective detail extends across the width of each respective rail.

The detail extends across the width of a rail surface and defines a first and second section of that rail, the second section forming a polygon with an inner wall longer than its outer wall.

Respectively for each rail, a respective detail defines a first and second section of each rail, the second section forming a polygon with an inner wall longer than its outer wall.

The second section is larger than the first section.

The first section is larger than the second section.

The detail is a groove with parallel sides.

The trailing side of the detail is oriented at an acute angle to the longitudinal axis of the slider.

The slider further includes a ramp section connected between the rails at one end of the rails and defining an upstream end of the slider, the rails' other ends terminating at a downstream end of the slider, a detail located on a rail nearer the upstream end of the slider than the downstream end of the slider.

The cavity has parallel sides.

The slider further includes a ramp section connecting between the rails, the rails coming closer together as they extend away from the ramp section.

The rails are tapered in.

The rails are parallel and not tapered.

The rails are not parallel and not tapered.

The rails have different configurations, one rail being longer than the other.

The rails have different configurations, one rail being wider than the other.

The detail is chevron-like.

At least one rail has a foil section defining a flared oblique edge.

In another aspect of the invention, a subambient pressure slider is provided for carrying a transducer near to the surface of a storage disk including a pair of coupled rails defining a pocket, the rails having elongated surfaces for facing the disk and oriented generally along the intended direction of motion of the disk, at least one groove being cut in at least one rail nearer to the leading end of the rail than to the trailing end of the rail, and the groove being oriented at an angle such that its leading end is nearer the inner side of the rail and its trailing end is nearer the outer side of the rail.

An embodiment of this aspect may include one or any combination of the following features:

The rails have different configurations, one rail being longer than the other.

The rails have different configurations, one rail being wider than the other.

The groove is a chevron.

At least one rail has a foil section defining a flared oblique edge.

In another aspect of the invention, there is provided a method for determining pressure relief features of a subambient pressure slider for carrying a transducer near to the surface of a storage disk, the slider including a pair of rails having elongated surfaces for facing the disk and oriented generally along the intended direction of motion of the disk, at least one pressure mitigating feature (such as a chevron) and foil (such as a flared oblique edge) defined on at least one of the rails, including the steps of iteratively solving the following slip-flow Reynolds equation:

$$\frac{\partial}{\partial x}\left[ph\frac{3\partial p}{\partial x}\left(1 + \frac{6\lambda}{h}\right)\right] + \frac{\partial}{\partial y}\left[ph\frac{3\partial p}{\partial y}\left(1 + \frac{6\lambda}{h}\right)\right] = 6\mu U \frac{\partial}{\partial x}(ph),$$

(where h = film thickness, p = pressure, U = linear velocity of disk, x = spatial coordinate in length, y = spatial coordinate in width, $\mu$ = viscosity of gas, and $\lambda$ = molecular mean free path of gas), for flying height performance, including trailing edge height, roll angle and pitch, to obtain foil flare angle and length, in a conventional manner.

Other advantages and features will become apparent from the following description of the preferred embodiment and from the claims.

DESCRIPTION OF THE PREFERRED EMBODIMENT

We first briefly describe the drawings.

FIG. 1 is a plan view of a portion of a magnetic disk storage device with a slider on an exemplary arm at zero yaw angle.

FIG. 2 is a bottom view of a prior art subambient pressure slider.

FIG. 3 is a view of a slider flying over a disk in a positive roll attitude.

FIG. 5 is a bottom view of the slider of FIG. 2 flying at a negative yaw angle, shown looking through a "transparent" disk.

FIGS. 7, 8 are a side view and trailing edge view, respectively, of the slider of FIG. 6, not to scale.

Figure 9B:
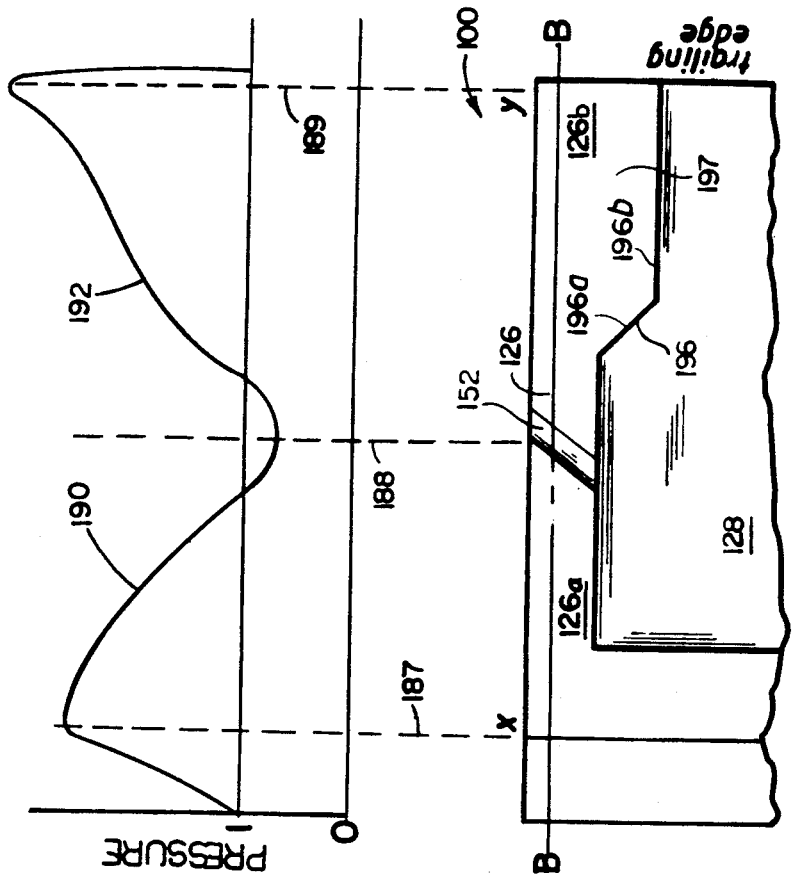
Figure 9A:
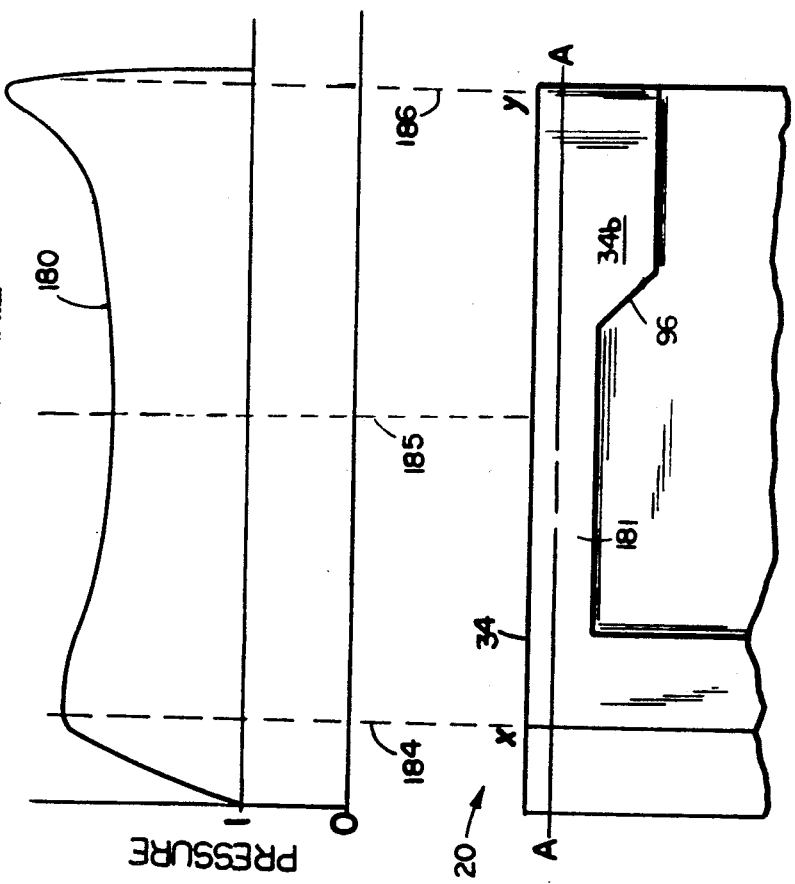

FIG. 9a relates the pressure profile for an inner rail or outer rail to the rail configuration in a prior art slider.

FIG. 9b relates to the pressure profile for an inner rail or outer rail to the rail configuration in a slider according to the present invention.

Figure 6:
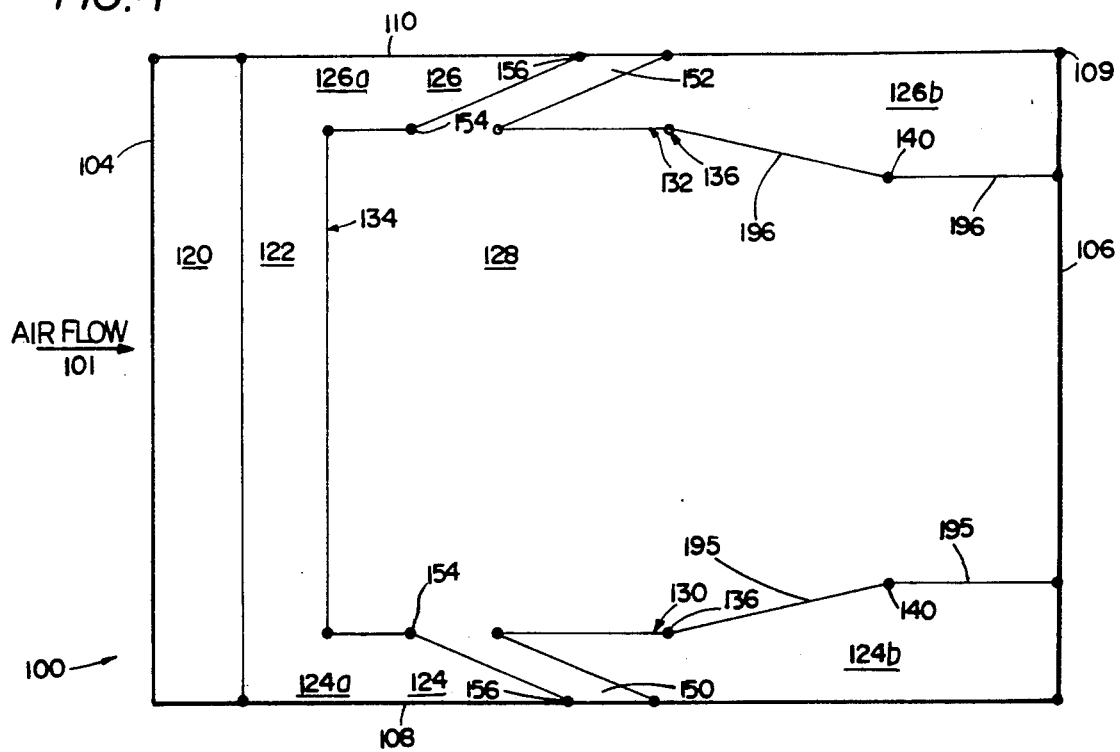
FIG. 6 is a bottom view of a preferred subambient pressure slider according to the present invention.

FIG. 10 shows the slider of FIG. 6 oriented parallel to the direction of air flow.

Figure 11:
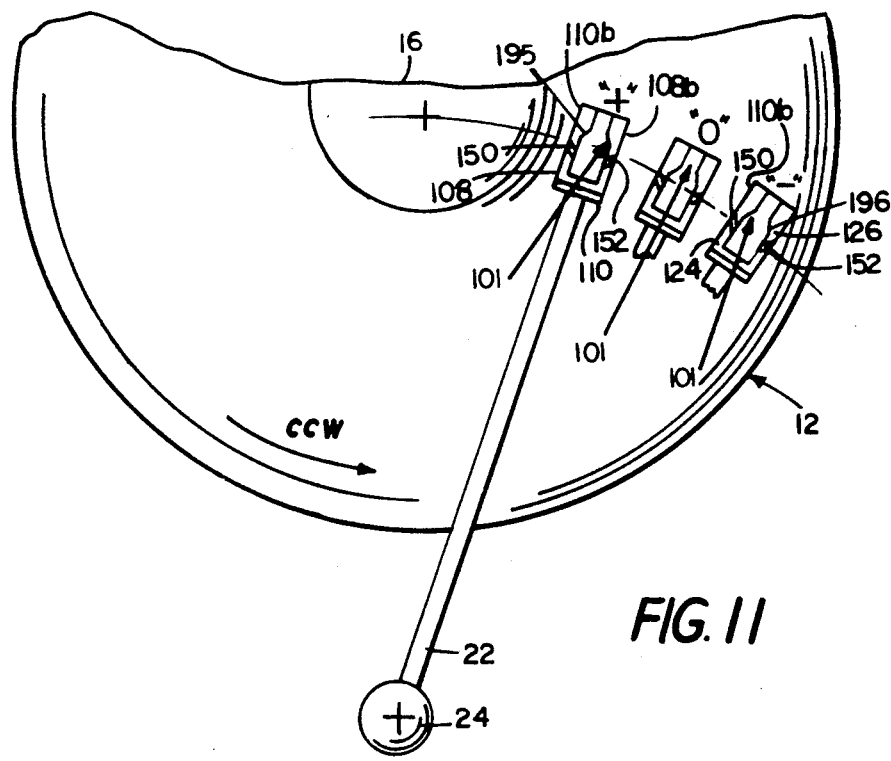

FIG. 11 shows an upward facing slider in three different orientations (positive, zero and negative yaw) relative to a disk, where the air bearing surface of the slider is shown looking through a "transparent" disk.

Figure 12:
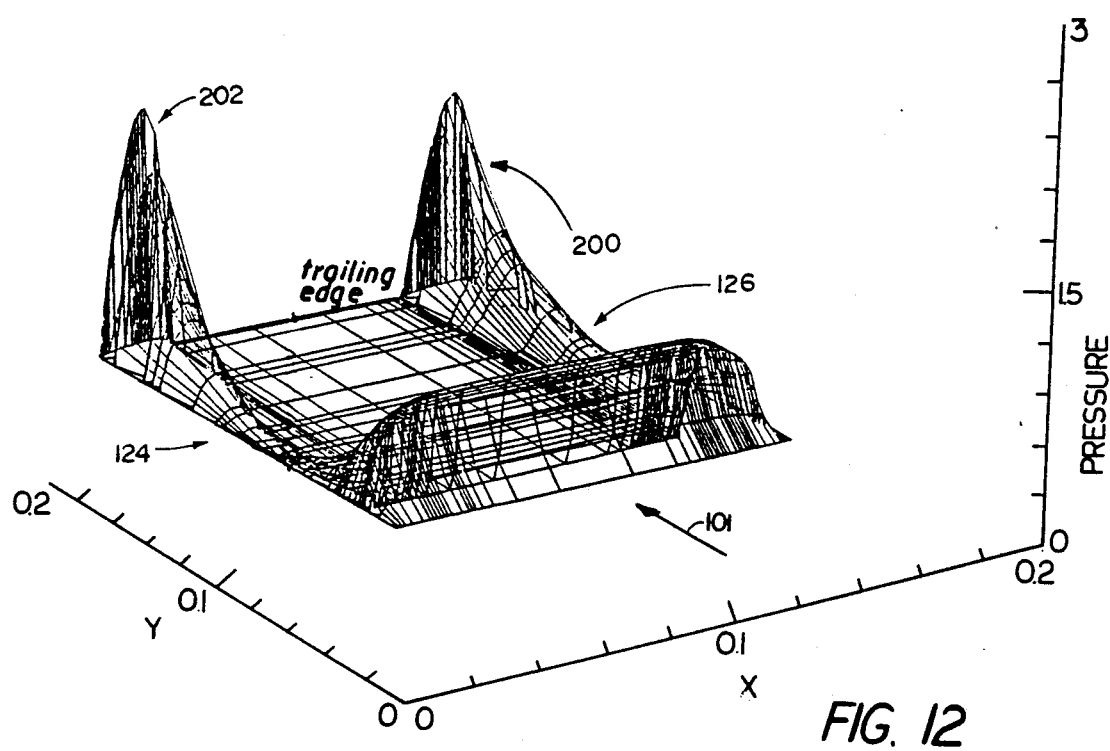

FIG. 12 is a graph of a simulated pressure profile at the bottom of a slider according to the preferred embodiment at zero yaw angle.

Figure 13:
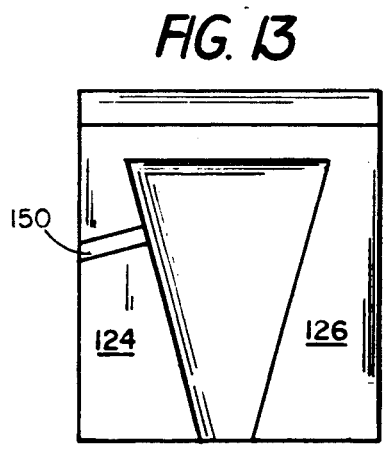
Figure 14:
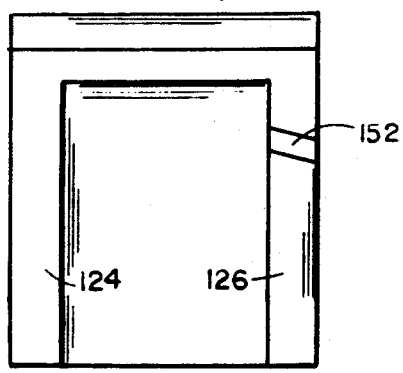
Figure 15:
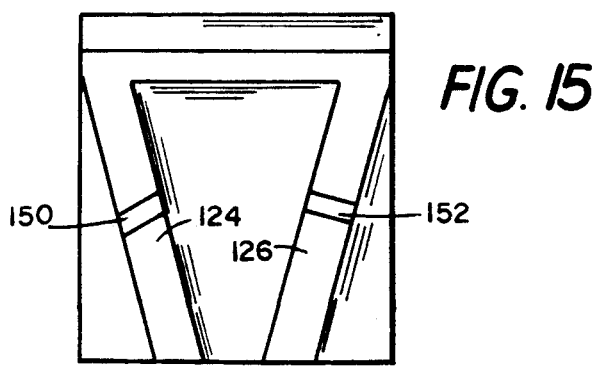

FIGS. 13-15 are alternative configurations of the slider of FIG. 6.

Referring to FIGS. 1 and 2, a typical disk storage device 10 includes a disk 12 having a surface 14 which extends from an inner radius 16 to an outer radius 18, with a multiplicity of recording tracks 17 defined on surface 14. A read/write head (not shown) is typically located on a slider 20 along trailing edge 99 facing surface 14. Slider 20 is mounted on a positioning arm/suspension assembly 22. Arm 22 is connected to and driven by a rotary actuator 24 capable of positioning slider 20 at any point along an arc 25 extending from inner radius 16 to outer radius 18. Disk 12 rotates beneath head 20 at high speed in a direction (as indicated by arrow 26). When the slider is positioned at a point 27 approximately midway along arc 25, the longitudinal axis 29 of slider 20 is tangential to the recording track 17 at that position, with zero yaw angle. At other positions of arm 22, the slider is at a yaw angle to the tangent.

Referring to FIG. 2, a typical subambient pressure slider 20 has two rails 32, 34 that face the disk surface 14, and a subambient pressure cavity 36. Air flowing between the disk and slider past a leading ramp 31 and under rails 32, 34 creates relatively high pressure under the rails to lift the slider above surface 14. Air flowing through cavity 36 is intended to create a counteracting subambient pressure to draw the slider toward surface 14. The net result is that a lower external load is required to fly the slider for a given height.

A small, relatively constant pressure difference is generated beneath rail 32 and rail 34, even when the slider is at zero yaw angle, i.e., at the tangential location 27 (FIG. 1), because of a small difference in the linear velocity of the disk at the two different locations beneath the two rails (points nearer the inner radius 16 of disk 12 have a lower linear velocity than points nearer the outer edge).

Thus, even without yaw, this pressure difference between rails 32 and 34 causes slider 20 to roll slightly. As shown in FIG. 3, the inner rail 34 flies closer to the disk center than does the outer rail 32, defining a "positive" natural roll angle A. The amount of the roll could be, e.g., 2.5 $\mu$ radians, shown at point 35 on curve 50, FIG. 4, which corresponds to the zero yaw point 27 on FIG. 1. If the slider were always kept at a zero yaw angle (i.e., tangential to the disk track), this type of roll would be relatively uniform regardless of the position of slider 20 along arc 25, and thus could be compensated such as by counterweighting.

In the configuration of FIG. 1, however, as slider 20 moves along arc 25, its yaw angle will change, resulting in a changing roll angle. These variances in roll are caused by changes in the angle of attack $\theta$ of the air flow on the slider. For example, referring to FIG. 5, with slider 20 (seen through "transparent" disk 12) at a negative yaw angle, e.g. $-10°$, (corresponding, for example, to point 42 on arc 25, FIG. 1) air strikes the rails of slider 20 (as indicated by air flow lines 41) at an angle of $-10°$ ($\theta$) relative to the longitudinal axis 29 of slider 20, which causes an additional roll component (about $+7\frac{1}{2}$ microradians) to be combined with the inherent roll effect (angle A; about $+2\frac{1}{2}$ microradians) of the slider. This additional roll component varies nonlinearly with yaw angle in accordance with a curve like curve 50, and is thus not subject t simple compensation by counterweighting.

Figure 4:
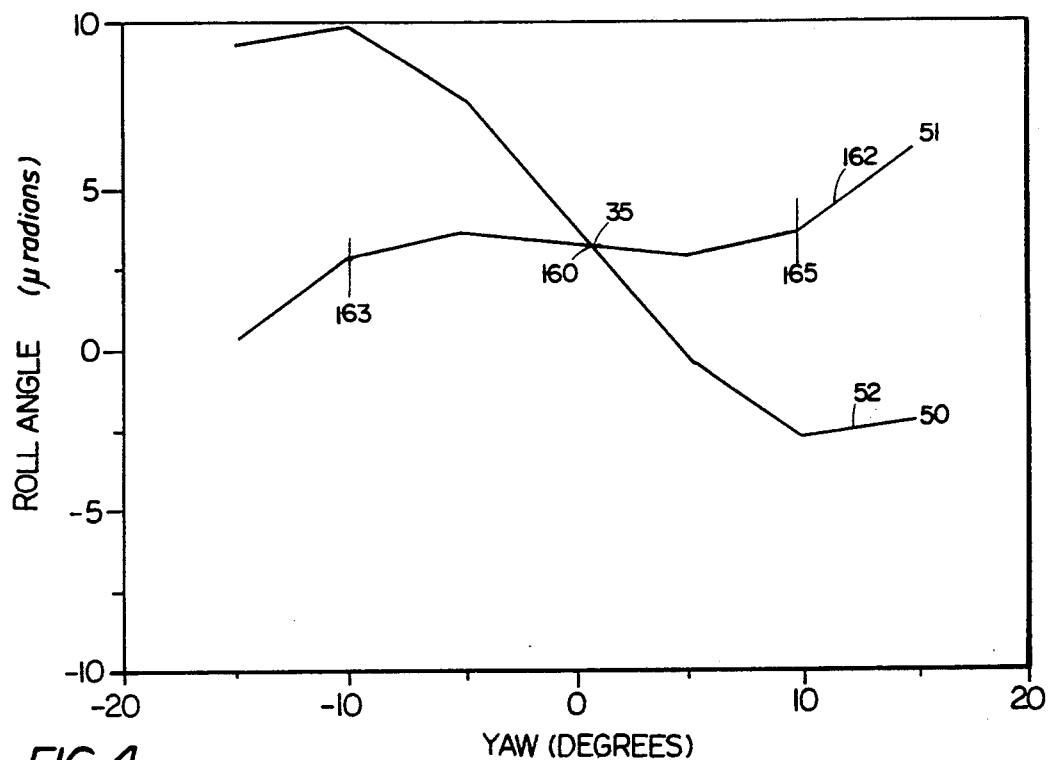
FIG. 4 is a graph of simulated representative roll angle as a function of yaw angle for a conventional subambient slider and for a slider according to a preferred embodiment of the invention.

As can be seen in curve 50, FIG. 4, negative yaw results in a positive angular roll component which adds to the inherent roll (angle A), while positive yaw results in a relative negative roll component which competes with inherent roll (angle A). Nevertheless, we have observed that it is possible to configure a slider to neutralize or relieve the additional roll component related to yaw angle, as will be explained in detail below.

Referring to FIGS. 6, 7, 8, in a preferred embodiment of the invention, rectangular slider 100 has a leading edge 104, a trailing edge 106, and two side edges 108, 110. A ramp 120 extends from leading edge 104 at an angle, for example of 50 minutes (not to scale in FIG. 7). A cross rail, or bridge, 122, located immediately downstream of ramp 120, joins two side rails 124, 126. Inner edges 130, 132 of rails 124, 126 run parallel, beginning where they connect to bridge 122 and continuing rearward to break points 136. From break points 136 to another pair of break points 140, inner edges 130, 132 define foils 195, 196 which flair inward toward each other, for example at an angle of about 15 degrees (not to scale in FIG. 6). From break points 140 foils 195, 196 extend back to trailing edge 106, and are parallel.

Inner edges 130, 132 (including foils 195, 196), together with bridge 122, enclose a subambient pressure cavity 128. Preferably, cavity 128 has a depth of from 200 microinches to 1000 microinches and is open along the trailing edge. Depending on the design for a given drive, the ramp angle will typically range at or below one degree and the flare angle will range as desired.

Slider 100 includes a pair of chevrons 150, 152, that cut across rails 124, 126, and connect cavity 128 to the exterior of slider 100. Chevrons 150, 152 are located between inner edge 134 of bridge 122 and break points 136 and extend rearward at an angle from a pair of points 154 along the inner edges 130, 132, to points 156 along side 108, 110. Preferably chevrons 150, 152 have the same depth as cavity 128. Depending upon design considerations, chevron angles and depths may be of varied configurations.

Referring to FIG. 9a, the pressure gradient under an example prior art rail 72 is shown (along line A—A) where dotted lines 184, 185, 186 relate local minima and local maxima of pressure gradient curve 180 to the configuration of rail 72.

Referring now to FIG. 9b, the expected pressure gradient under rail 126 (along line B—B) in practice of the present invention has been approximated, where dotted lines 187, 188, and 189 relate local minima and local maxima of pressure gradient curve 190 to the configuration of rail 126. FIG. 9b demonstrates our belief that an entirely different gradient buildup is experienced compared to the prior art configuration of FIG. 9a. To wit: curve 190 peaks at about the beginning of cavity 128 (point X) and is relieved down to about atmospheric level or lower at chevron 152. Thereafter, the pressure gradient peaks again at point Y near the trailing edge of slider 100.

In either configuration of FIG. 9a or 9b, as slider 20 (FIG. 5) or 100 (FIG. 10) goes into negative yaw, a respective foil 96, 196 will turn into the air flow. However, owing to the chevron configuration of the invention, substantially different roll response will be experienced. This is because several factors influence the tendency for a yaw attitude to induce a roll attitude. Among these are (a) pressure gradient under the slider (such as under the rails) relative to the transverse sliding component due to yaw, and (b) the effective local wedge of any oblique edge presented by the slider. Hence, the chevron effects the gradient and the flair presents an oblique edge, as yield favorable results.

Since force is directly proportional to pressure times area, the incremental increase ($\Delta$) in pressure related to section 126b (for a negative yawed embodiment of the invention) compared to that related to equivalent section 34b (after the dotted line 185 in prior art FIG. 9a) is as shown below:

$$\frac{\Delta P126b}{\Delta P124b} \geqq \frac{\Delta P34b}{\Delta P32b}$$

The same comparison related to positive yaw is:

$$\frac{\Delta P124b}{\Delta P126b} \geqq \frac{\Delta P32b}{\Delta P34b}$$

Therefore, in practice of the present invention, as slider 100 experiences negative yaw air flow 101 impinges upon the effective wedge of foil 196 of section 126b (either solely at flair 196a or in conjunction with extension 196b) after chevron 152 of rail 126, whereupon an incremental pressure increase is generated (as indicated by the steep climb of curve 190 from low point 191). This pressure increase is greater here than that generated at section 124b, given the negative yaw of the slider, causing rail 126 to fly higher than rail 124. We speculate that foil 196 cooperates with chevron 152 to produce this favorable result. In an alternative embodiment, the flared foil 196 might not flare at all and yet still would present an oblique edge of the negatively yawed slider turned into the air flow, which, in cooperation with chevron 152, would yield the favorable result we have discovered.

FIGS. 10 and 11 together show slider 100 in the positive, zero and negative yaw conditions, where it can be seen that as slider 100 yaws, not only is foil 195 or 196 presented to air flow 101, but also the now leading outside edge 108 or 110 is presented as an oblique edge. It is possible that the resultant interaction of the air flow at both the inner foil 195 or 196 and outer foil 108 or 110 (or possibly at post-chevron foils 108b or 110b) contributes to the result of the invention.

According to curve 51 of FIG. 4, in practice of the present invention, between about zero and about negative ten degrees yaw only about zero to perhaps one-half microradians additional roll component (compared to a very substantial roll component shown in curve 50) is imparted to the slider. Beyond about negative ten degrees yaw, a negative roll component is imparted to the slider.

It will now be understood that, in the negative yaw condition, foil 195 is essentially turned away from air flow 101, although outer foil 108 (or 108b) on rail 124 is presented to air flow 101. It is speculated that the cross-sectional area of foil 196 presented to air flow 101 should be greater than that presented by foil 108b, thus resulting in the desired gradient at rail 126, such as seen in FIG. 11.

In the positive yaw condition, the features of the invention will apply likewise to chevron 150, foil 195, rail 124 and the outer wall foil 110b, and will result in roll-reducing compensation. Comparing curves 50, 51, it will thus be seen that the invention will provide a positive roll component to cancel the relative negative roll of the positively yawed slider, at least up to about ten degrees yaw for the case shown. It will be appreciated, however, that the 10 degree yaw is not a limitation of the invention.

Thus it will now be appreciated that for a non-zero yaw angle, chevrons 150, 152 and foils 195, 196, 108b, 110b, are not oriented symmetrically with respect to air flow 101. This lack of symmetry affects the air flow beneath rails 124, 126 and in cavity 128, resulting in a reduction of the roll-inducing pressure differential beneath the slider that would otherwise be associated with a non-zero yaw angle roll in a prior art device (see curve 50, FIG. 4). Therefore, the variation in roll angle as a function of yaw angle (typically experienced by prior art subambient pressure sliders) can be substantially reduced or eliminated, in practice of the present invention, as indicated by curve 51 of FIG. 5. Hence, in one embodiment of the invention, between yaw angles of roughly ±10 degrees, an approximate uniformity of roll angle was measured, and nearer uniformity was experienced even beyond ±10 degrees comparing curve 51 to curve 50.

The lowered sensitivity of slider 100 to yaw angle with regard to roll angle eliminates roll as a major difficulty in the implementation of subambient pressure sliders in disk drive systems. The use of chevrons achieves this result without affecting the other characteristics of subambient pressure sliders including, for example, low flying height with low external load, higher air bearing stiffness and better damping.

FIG. 12 is a graph of a simulated pressure profile at the bottom of a slider according to the preferred embodiment at zero yaw angle.

Alternative embodiments of the invention are shown in FIGS. 13-15, where rails 124, 126 assume tapered in (FIG. 13), fully parallel and not tapered (FIG. 14), and not parallel and not tapered (FIG. 15) orientations. In addition, at least one chevron 150, 152 can be provided in at least one rail 124 or 126 at any suitable location in accordance with the invention.

Furthermore, while chevron configurations have been described, other pressure impacting configurations are equally considered within the present invention, including inserts, grooves, slots, structures, details, incisions, features, passages, barriers, and the like.

The optimum configuration of a slider in practice of the present invention will depend upon desired application, e.g., for a given arm, disk, slider, radius and yaw relation, and speed, for example. Hence, determination of optimum foil flare angle length can be numerically modelled by solving the following modified Reynolds equation:

$$\frac{\partial}{\partial x}\left[ph\frac{3\partial p}{\partial x}\left(1+\frac{6\lambda}{h}\right)\right]+$$

$$\frac{\partial}{\partial y}\left[ph\frac{3\partial p}{\partial y}\left(1+\frac{6\lambda}{h}\right)\right]=6\mu U\frac{\partial}{\partial x}(ph)$$

(where h=film thickness, p=pressure, U=linear velocity of disk, x=spatial coordinate in length, y=spatial coordinate in width, $\mu$=viscosity of gas, and $\lambda$=molecular mean free path of gas), for flying height performance, including trailing edge height, roll angle and pitch. This is an iterative process.

Other embodiments are within the following claims.

What is claimed is:

1. A slider for moving a transducer across the surface of a storage disk while maintaining the transducer in close proximity to the disk surface, said slider comprising:

two elongated rails extending from an upstream region of said slider to a downstream region of said slider, each rail having a surface for facing the disk and being configured to develop relatively high pressure under at least said upstream region of said rail as air flows between the slider and the disk surface to cause said slider to be lifted above the surface of the disk, said rails being coupled together to form a cavity, said cavity developing a subambient pressure that tends to draw said slider toward the surface of the disk;

at least one of said rails having a region disposed intermediate said upstream region and said downstream region that is configured to relieve said relatively high pressure and induce a relatively low pressure under said intermediate region, said intermediate region including a groove positioned to allow air to flow between said cavity and an area outside of said cavity, said rail being configured downstream of said intermediate region to cause said relatively high pressure that had been developed under said upstream region to substantially redevelop under said downstream region, whereby the distance between said surface of said rail and the disk surface is maintained equal to the distance between said surface of the other said rail and the disk surface as said slider moves across the disk surface.

2. The slider of claim 1 wherein said rails are coupled by a ramp section.

3. The slider of claim 1 wherein each of said rails comprises said intermediate region.

4. The slider of claim 1 wherein said rails are coupled together at their respective upstream regions by an elongated portion, said groove positioned in said at least one rail at a location closer to said upstream region than to said downstream region.

5. The slider of claim 1 wherein said cavity has a predetermined depth with respect to said surfaces of said rails, said groove having a depth in said at least one rail that is substantially equal to said predetermined depth.

6. The slider of claim 1 wherein said groove has parallel sides.

7. The slider of claim 1 wherein said groove extends across said surface of said at least one rail and intersects an inner wall of said at least one rail at a positive acute angle.

8. A slider for moving a transducer across the surface of a storage disk while maintaining the transducer in close proximity to the disk surface, said slider comprising:

two spaced, elongated rails, each having a surface for facing the disk, said rails being coupled together by a ramp section to form a cavity, said cavity developing a subambient pressure that tends to draw said slider toward the surface of the disk;

said rails extending from said ramp section so that the space between said rails decreases as the rails extend from said ramp section;

wherein at least one of said rails comprises a groove positioned to allow air to flow between said cavity and an area outside of said cavity, said groove serving to maintain the distance between said surface of one said rail and the disk surface equal to the distance between said surface of the other said rail and the disk surface as said slider moves across the disk surface.

9. A slider for moving a transducer across the surface of a storage disk while maintaining the transducer in close proximity to the disk surface, said slider comprising:

two elongated rails, each having a surface for facing the disk, said rails being coupled together to form a cavity, said cavity developing a subambient pressure that tends to draw said slider toward the surface of the disk;

at least one of said rails including a region that tapers toward the other one of said rails;

wherein at least one of said rails comprises a region that is relieved to a depth substantially equal to a depth of said cavity, said relieved region serving to maintain the distance between said surface of one said rail and the disk surface equal to the distance between said surface of the other said rail and the disk surface as said slider moves across the disk surface.

10. The slider of claim 9 wherein said relieved region comprises a groove positioned to allow air to flow between said cavity and an area outside of said cavity.

11. A slider for moving a transducer across the surface of a storage disk while maintaining the transducer in close proximity to the disk surface, said slider comprising:

two elongated rails extending from an upstream region of said slider to a downstream region of said slider, each rail having a surface for facing the disk and being configured to develop relatively high pressure under at least said upstream region of said rails as air flows between the slider and the disk surface to cause said slider to be lifted above the surface of the disk, said rails being coupled together to form a cavity, said cavity developing a subambient pressure that tends to draw said slider toward the surface of the disk;

at least one of said rails having a region disposed intermediate said upstream region and said downstream region that is configured to relieve said relatively high pressure and induce a relatively low pressure under said intermediate region, said intermediate region being relieved to a depth substantially equal to a depth of said cavity, said rail being configured downstream of said intermediate region to cause said relatively high pressure that had been developed under said upstream region to substantially redevelop under said downstream region, whereby the distance between said surface of said rail and the disk surface is maintained equal to the distance between said surface of the other said rail and the disk surface as said slider moves across the disk surface.

12. The slider of claim 11 wherein said relieved region comprises a groove positioned to allow air to flow between said cavity and an area outside of said cavity.

13. A slider for moving a transducer across the surface of a storage disk while maintaining the transducer in close proximity to the disk surface, said slider comprising:

two elongated rails extending from an upstream region of said slider to a downstream region of said slider, each rail having a surface for facing the disk and being configured to develop relatively high pressure under at least said upstream region of said rails as air flows between the slider and the disk surface to cause said slider to be lifted above the surface of the disk, said rails being coupled together to form a cavity, said cavity developing a subambient pressure that tends to draw said slider toward the surface of the disk; and at least one of said rails having a groove extending across its surface and disposed intermediate said upstream region and said downstream region, said groove relieving said relatively high pressure and inducing a relatively low pressure under said groove, said rail being configured downstream of said groove to cause said relatively high pressure that had been developed under said downstream region, whereby the distance between said surface of one said rail and the disk surface is maintained equal to the distance between said surface of the other said rail and the disk surface as said slider moves across the disk surface.

* * * * *

UNITED STATES PATENT AND TRADEMARK OFFICE
CERTIFICATE OF CORRECTION

PATENT NO. : 5,097,370

DATED : March 17, 1992

INVENTOR(S) : Yiao-Tee Hsia

It is certified that error appears in the above-identified patent and that said Letters Patent is hereby corrected as shown below:

Title page, item (56):

<u>References Cited (U.S. PATENT DOCUMENTS)</u>
"4,751,135  10/1984  Warner et al." should read
--4,475,135  10/1984  Warner et al.--

Column 4, line 33, "t" should read --to--.
Column 6, line 14, insert --,-- (comma) after "yaw".

<u>Claims</u>
Column 10, line 22, claim 13, before "downstream" insert
--upstream region to substantially redevelop under said--.

Signed and Sealed this

Twenty-eighth Day of September, 1993

Attest:

BRUCE LEHMAN

Attesting Officer    Commissioner of Patents and Trademarks